United States Patent
Cosgrove

(10) Patent No.: US 7,369,918 B2
(45) Date of Patent: May 6, 2008

(54) SYSTEM AND APPARATUS FOR GENERATING MAILERS ON DEMAND

(75) Inventor: Rodger T. Cosgrove, Balboa, CA (US)

(73) Assignee: Rodger Cosgrove, Riverside, CA (US)

( * ) Notice: Subject to any disclaimer, the term of this patent is extended or adjusted under 35 U.S.C. 154(b) by 156 days.

(21) Appl. No.: 11/183,201

(22) Filed: Jul. 15, 2005

(65) Prior Publication Data

US 2006/0022453 A1 Feb. 2, 2006

Related U.S. Application Data

(60) Provisional application No. 60/588,112, filed on Jul. 15, 2004.

(51) Int. Cl.
*G06F 7/00* (2006.01)
*G06F 16/00* (2006.01)
*G06Q 10/00* (2006.01)
*B65D 27/00* (2006.01)

(52) U.S. Cl. .................. 700/213; 705/1; 706/62; 229/68.1

(58) Field of Classification Search ............ None
See application file for complete search history.

(56) References Cited

U.S. PATENT DOCUMENTS

| | | | | |
|---|---|---|---|---|
| 5,802,503 A | * | 9/1998 | Sansone | .......... 705/401 |
| 5,873,073 A | * | 2/1999 | Bresnan et al. | .......... 705/410 |
| 5,918,220 A | * | 6/1999 | Sansone et al. | .......... 705/408 |
| 6,937,989 B2 | * | 8/2005 | McIntyre et al. | .......... 705/1 |
| 6,950,800 B1 | * | 9/2005 | McIntyre et al. | .......... 705/1 |
| 7,100,348 B2 | | 9/2006 | Mertens | |
| 2003/0167241 A1 | * | 9/2003 | Gilham | .......... 705/405 |

OTHER PUBLICATIONS

International Search Report and Written Opinion for Cosgrove PCT/US05/25323.

\* cited by examiner

*Primary Examiner*—Alan S. Chen
(74) *Attorney, Agent, or Firm*—Kenton B. Abel

(57) ABSTRACT

A method of generating a mailer on demand by receiving data for an envelope and a matching document in a computer, placing data for the envelope and the document in a production queue, generating the envelope using the data, generating the document using the data, automatically verifying the correct generation and sequence of the envelope, automatically verifying the correct generation and sequence of the document, removing any envelope or document if the verification process returns a false condition for correct generation or sequence in order to maintain order integrity of the production queue and automatically regenerating the incorrectly generated or sequenced piece and all other corresponding piece(s) of the mailer, and matching a verified envelope with a matching verified document and creating the mailer.

12 Claims, 2 Drawing Sheets

SYSTEM AND APPARATUS FOR GENERATING MAILERS ON DEMAND

This application claims benefit under 35 U.S.C. §119(e) to U.S. Ser. No. 60/588,112, filed Jul. 15, 2004, entirely incorporated by reference.

FIELD OF THE INVENTION

The present invention relates to generating and sending mailers, or more generally any targeted, printed graphic communication, composed of a document of one or more pages enclosed in a matching envelope. More specifically, the present invention relates to the design or creation of a mailer or mailers at one location and the manufacturing and dispatch or posting of said mailer(s) at a second location.

BACKGROUND OF THE INVENTION

Conventionally, to create a letter or mailer one would locally print a document such as letter text or other message on letterhead or a form, insert the document into an envelope, affix postage and enter into a delivery/postal service. This would require having materials on hand such as preprinted flat paper stock and pre-converted and pre-printed envelopes which become obsolete and require storage, a printing device such as a typewriter or laser printer with related supplies and power, postage, and labor to execute the printing, assembly and posting of the mailer.

Commercial lettershops typically produce letters for clients in larger batches on pre-printed stock with long lead times and little, if any, variation in graphic presentation. Mailer production can be outsourced to a secretarial service, especially for the production of mailers one at a time, however this is still produced on pre-printed stationery which must be inventoried for potential demand.

There is now emerging an industry to create "printing on demand" in order to reduce the need to inventory pre-printed stock and to increase the flexibility of designs for production. Currently, several providers of letter on demand services have emerged such as Zairmail or Postcards.com. These providers either do not use envelopes, simply manufacturing postcards instead, or they use a generic double window envelope to enclose a document and show delivery and return address information. Usually their production systems are not economical in very small batches, especially one unit. If they do provide one unit production it involves "hand work" and is much more costly to produce than with the current invention. The use of a double window envelope conveys little or no graphic information on the carrier envelope and gives the mailer a distinctively limited and "pre-fabricated" look.

SUMMARY OF THE INVENTION

The present invention consists of a system and method for a) accepting demands from a user through a computer to automatically manufacture a physical mailer consisting of a custom printed document enclosed within a matching custom printed envelope, b) retaining a digital record of the mailer for archiving, and c) posting the mailer into the postal system or other delivery network.

The present invention may accept mailer demands for production from various channels. A mailer consists of any combination of static text and images and variable text and images to be merged and printed onto the mailer's constituent parts. Mailers can be processed in quantities of from one to any quantity.

The present invention differs from any prior art in that it constructs an outside envelope to match, on a unit by unit basis, a simultaneously constructed interior document. It then verifies that the intended mailer's constituent document and envelope match into a complete set, inserts the document into the envelope, and then re-verifies finished production and assignment to a postal presort tray or the like for entry into a delivery logistics system such as the US Postal Service or private carrier such as Fedex or DHL, and also for reporting back to the business process management software programs and thence to the user.

The present invention provides several advantages over the prior art. For example, the user does not need to keep any letterhead, forms or envelopes on hand. Also, the user does not need a printer on hand nor does the user does not need to keep any postage on hand. Production can be demanded from anywhere at any time. Additionally, production economies of scale inure to the small user's benefit because all production is digital at a scale of one unit regardless of the total number of units or the total number of users. Production can be fully executed and verified in a matter of minutes or faster. Business process management software does not allow for any missing units from all units demanded. And, since all production is digitally managed, including document composition, a record of each unit including a digital image, time stamp, etc. is maintained as long as desired. Demand can be automated from any number of processes, for example, from customer relationship management (CRM) software. Further, components can be modified at will. Design libraries, templates and tools may be applied to automatically or semi-automatically generate mailers.

DETAILED DESCRIPTION OF THE INVENTION

As used herein, "Mailer" means a document of one or more pages enclosed within an envelope and targeted to an individual recipient. "Document" means a custom printed graphic communication, usually printed on flat paper or other substrate. "Envelope" means a carrier for the document custom printed to match the document and converted, i.e., folded and glued, into a typical envelope configuration. "Form Set" means a defined physical configuration exclusive of graphic design or data to be manufactured and assembled. "Production Queue" means all the individual units demanded within a particular form set for manufacture and posting in a certain batch. "Mailer Demand" means input into the invention from the user that specifies the desired form set and all the graphical data and targeting or addressing data necessary to generate the desired mailer. "Business Process Management & Workflow Control Software" means an integrated suite or system of existing industry standard computer programs and custom written computer programs that manages the several functions between the User and the invention, and among the several data processing and manufacturing operations that collectively comprise the invention. "Pattern Recognition Artificial Intelligence" means a system typically using video cameras to capture an image of a printed item or a portion of that item for comparison with an image from another printed item using a computer program to evaluate the imagery and verify that the images correspond appropriately within the manufacturing process.

Figure 1:
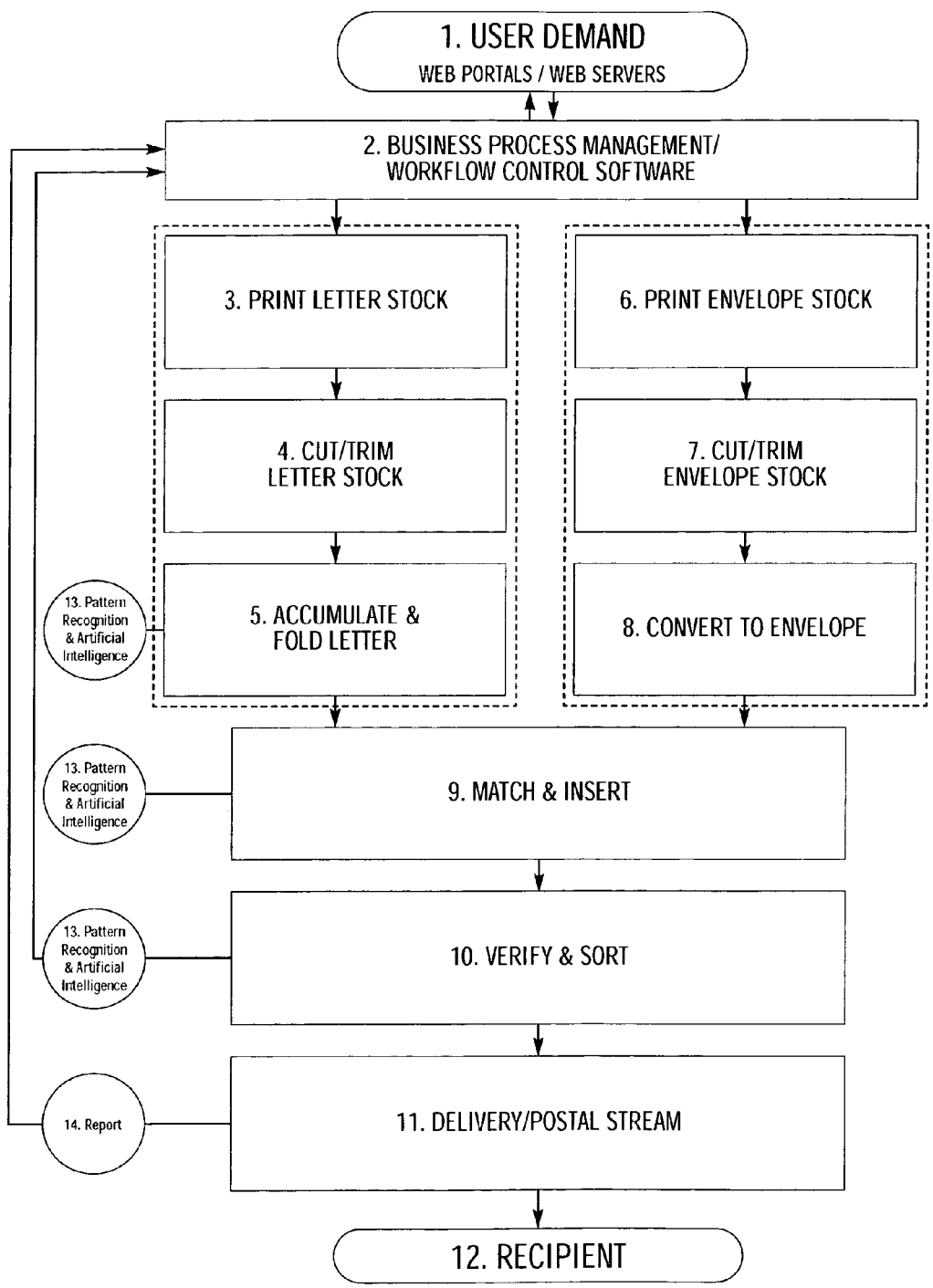
FIG. 1 is a schematic drawing showing the functional components of one embodiment of the present invention, beginning with the User and following the process of demanding, manufacturing and posting a mailer.
Figure 2:
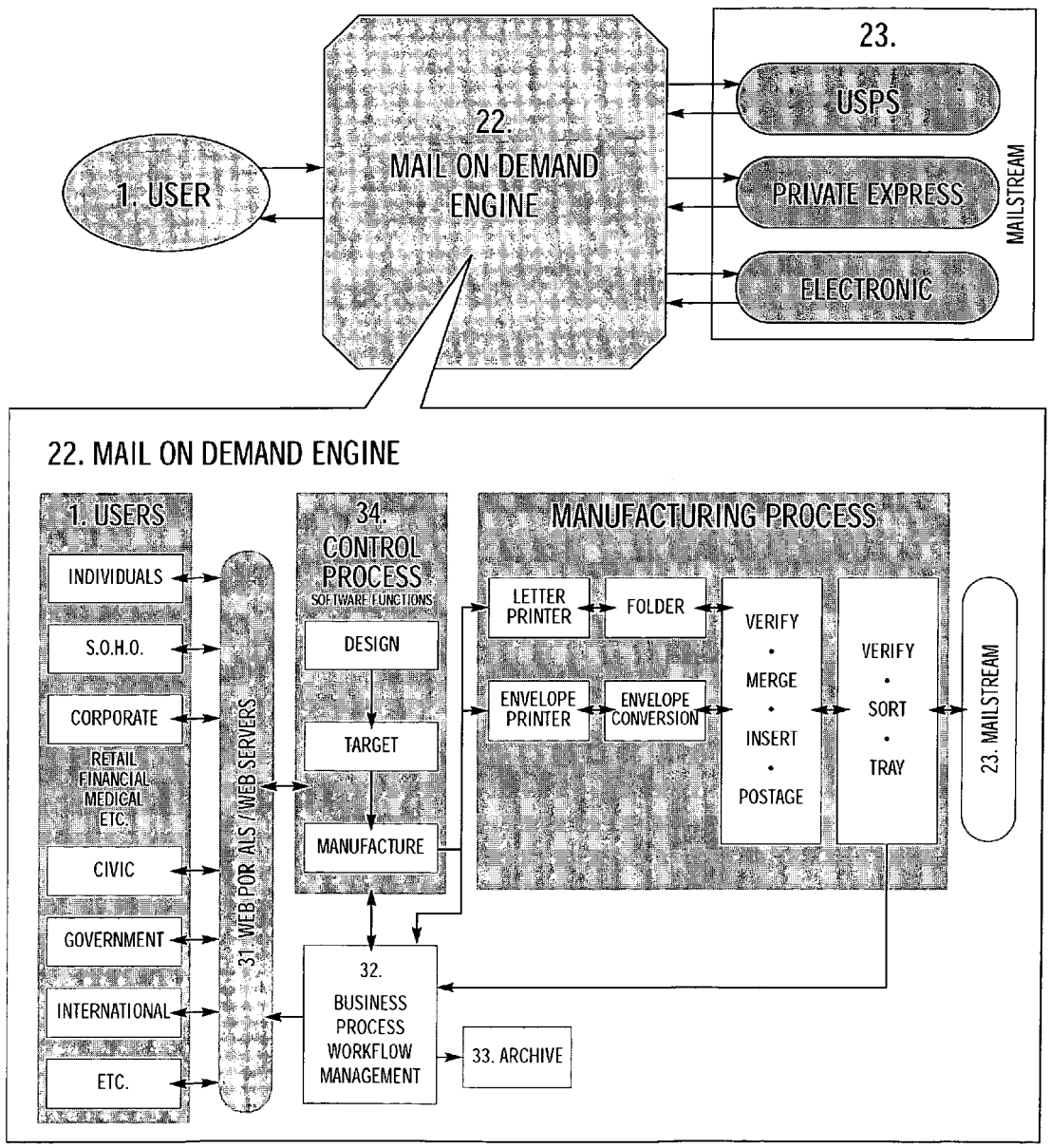
FIG. 2 is a schematic drawing showing the principle functional components of an embodiment of the present invention, emphasizing the availability of multiple delivery channels from the invention and the varied nature of different potential users and channels into the invention's functionality.

Following is a more detailed explanation of the principle components of the present invention. In reference to FIGS. 1 & 2, a user 1 may send a demand to the system for a mailer (any envelope enclosed document). The user 1 could be any natural person, business or other party, or even an automated system using means including, but not limited to, an internet site, web portal or telephone interface. Users 1 could access the invention from any physical location given some channel, e.g., web servers, web sites, email, FTP transfer, or print drivers to communicate appropriately. For example, the user 1 could also be an automated process creating demands through a web server, e.g., a sales transaction at an automated point-of-sale system triggers a demand for a "thank you" letter.

An integrated suite of computer programs represented in Business Process Management/Workflow Control Software (BPM) 2 accepts the user's 1 mailer demand and control the production processes, e.g., document composition, job queuing, pattern recognition verification, production reporting, etc. The BPM software 2 can use currently available commercial software programs in conjunction with custom written computer programs utilizing existing and emerging protocols such as the Print On Demand Initiative's (PODI) Personalized Print Markup Language (PPML) and The International Cooperation for the Integration of Processes in Prepress, Press and Postpress Organization's (CIP4) Job Description Format (JDF) among others to help in the coordination and automation of the invention's functions. The actual configuration of the BPM 2 functions may be more or less complex depending upon the type and sophistication of the user 1. In its simpler form it need only specify a particular mailer and enter it into the production queue. In a more complex form it could link to design tools, templates, libraries or other data sources for various types of applications and include other functions such as archiving electronic versions of demanded mailers.

Blank paper is printed with any image by a digital press in one pass 3. For example, a signed letter on letterhead would have the letterhead logo and address information, the letter text, and the sender's signature all printed at once thereby eliminating any need to inventory pre-printed stock or to handle a sheet of paper more than once for imaging or printing. Recently available industrial digital presses such as Xerox's iGen3 or Kodak's NexPress provide print quality rivaling offset lithography. These printers can physically accommodate several types and sizes of paper or other substrates for printing and for inclusion within the production queue for a given form set. This is also an example of how the BPM 2 functions would need to specify the appropriate paper stock through an application program interface (API) to the printer controller software.

The document and the envelope may be printed on a single sheet of paper such that the document envelope blank needs to be cut apart from the larger sheet 4. Additionally, designs that "bleed" (image printed past the finished document's edge and then trimmed) may be trimmed at this point. Documents may be more economically printed in multiple sets on one larger sheet, e.g., "2-up", and then cut into finished document sheets. This device could be a programmable cutter such as manufactured by Polar or Itec. Material could move from one physical lettershop or bindery type operation to the next in a fully automated fashion or by hand or by some combination of methods.

The trimmed letter is folded to be inserted into an envelope 5. Letters of multiple sheets are accumulated before folding. At this point it is necessary to employ pattern recognition/artificial intelligence 13 to ensure accurate matching and accumulating prior to folding. Devices such as this are currently manufactured or integrated by Bowe/Bell & Howell, MBO and others.

To custom print the envelope, blank paper is printed with any image by a digital press in one pass 6. The envelope stock's image could cover the entire envelope surface with graphics and could contain any information such as a return address and logo "corner card", recipient's address, and postage indicia. As with the document printing 3, the envelope is printed all at once and simultaneously with the document, thereby eliminating any need to inventory pre-printed stock or to handle a sheet of paper more than once for imaging or printing. This would be handled by the same sort of printer used for printing the document.

The printed envelope stock is trimmed or die cut prior to conversion into a finished envelope using a standard type of commercial die cutter 7.

The flat, digitally pre-printed envelope stock is converted, that is folded and glued, into a finished envelope 8. None of the prior art is creating digital envelopes automatically and performing the next step at a unit by unit level instead of a pre-defined batch operation. The envelope conversion can be executed by machinery from such manufacturers as Winkler and Dunnebier or F. L. Smithe. By maintaining strict order integrity between the document and envelope stock within the production queue, the constituents of the mailer are aligned to be automatically combined at the next step.

The matching letter and finished envelope converge 9. Pattern recognition artificial intelligence 13 verifies an accurate match of the corresponding components and the letter is inserted into the envelope. If there is not an accurate match the system will stop the manufacturing process and may re-demand the letter package. Bowe/Bell and Howell and Pitney Bowes currently manufacture suitable devices for this task. The finished letters are essentially ready to be mailed at this point, however it is desirable to do additional processing in order to verify that all mailer units demanded are present and accounted for, and also to organize for postal system work sharing, i.e., presorting, thereby earning maximum postal discounts.

Each completed mailer unit is identified by an automated sorter 10 using video capture and pattern recognition artificial intelligence 13. The mailer is matched against the list of demanded mailers for the production queue in a computer database that is part of the business process management (BPM) 2 functions. Any missing letters are re-demanded by the BPM 2 software. Verified letters are sent by the sorter to appropriate sort bins for entry into the postal letter stream or other means of delivery and a report is made, including a time stamp, to the BPM 2 software. In this way a closed end loop and audit trail is integral to the BPM 2 functions so that users may be highly confident that their mailers were completed and mailed at a definite time. This feature is extremely useful for users 1 needing reliable verification of system fulfillment of mailer demands such as issuers of regulatory mandated letters, sales managers tracking employee communications, or many other applications.

Such a sorter 10 also facilitates commingling of mailers from multiple users for maximum postal discounts. Bowe/Bell and Howell and Pitney Bowes currently manufacture suitable devices for this task.

The present invention's output can be sent to intended recipients through any number of delivery channels, e.g., USPS, FedEx, UPS, etc 11. The delivery services can typically report to the user 1 certain delivery details, in which case the BPM module 2 which can relay data to the user 1.

The intended recipient of the mailer 12 is the final stage of the process and can be any designated target of the user.

There are pattern recognition artificial intelligence nodes in the production sequence 13 at which verification of the presence of certain components or the finished mailer should be made. At these points video cameras scan each piece and verify a match or order sequence integrity within the production queue according to the computer program within the business process management and workflow control software 2. This technology is available from Bowe/Bell and Howell or Lake Image Systems for integration with the BPM functions of the present invention.

FIG. 2a shows a simplified diagram illustrating the various outbound channels available to the present invention and FIG. 2b elaborates on some of the potential users and components of the control process.

The Mailer On Demand Engine 21 is composed of the integrated systems of software, hardware and manufacturing processes, schematically illustrated in FIG. 2a, that control the invention's operations.

The potential outbound delivery channels 22 would typically be the postal service but it could also be private express organizations or electronic transmission.

The typical gateways 31 into the invention's functionality that accepts mailer demands are expected to be web portals and web servers which can be linked through any number of applications.

An important extension of the BPM 2 functions is the ability to digitally archive any mailers for review by the user 1 by employing a computer's disk storage memory used to store digital files of mailers demanded of the invention in a format such as Portable Document Format (PDF). Tags such as the date of manufacture of the mailer, date and time of entry into the postal stream, and date of entry at the destination delivery unit (DDU) can be attached to the digital version of the mailer for reference or audit purposes.

Another important extension or set of extensions from the BPM 2 software are the tools for the user 1 to access in designing, targeting, and scheduling the mailer 34. These could be proprietary and custom software tools and databases or simply links to other resources for these purposes.

The present invention includes the methods and systems for transmitting the mailer demand to the processing system. The system uses many different forms of inputs into the system, including: web servers—XML or other data for predefined mailing templates; web servers—XML data and direct images from a customer's system; web servers—via Print Driver; FTP sites—similar to web servers. Data can be uploaded manually, using an FTP tool like Leech, or automatically from any kid of program. The web servers might store files into the same folders on the FTP site that are used for direct upload. Inputs could also include: websites—direct design and entry on a website; email—send attachments to, for example, PrintIt@ The present invention.Net; print drivers.

One such method is a print driver that can be linked to popular software products such as Microsoft Word, Word-Perfect, etc. The print driver collects the data required to make up a mailer demand and sends it to the Print Driver Web Server. The Print Driver Web Server is a special web server that expects input generated by a print driver distributed to users.

The present invention's control system is methodologically individualistic or unit focused, as opposed to a conventional batch orientation, in its application of pattern recognition artificial intelligence to automatically match components of the mailer, on a unit by unit basis, so that it is practical to demand and manufacture one unit at a time from multiple sources or users.

Many possible uses are for the present invention exist. Examples include, but are not limited to: retail transaction triggers CRM software to send a marketing letter; Cub scouts sending out a letter to everyone in a troop; agent based sales organization's agents send letters to clients; credit granting companies send "turn down" letters or other mandated communications; medical office sending out mailers to remind patients of appointments; and intercontinental or other long distance mail. Distance is physically eliminated except with respect to the recipient's proximity to a production center.

I claim:

1. A method of generating a plurality of mailers on demand comprising:
   (a) receiving in a computer a plurality of data sets for a plurality of mailers, wherein each of said plurality of data sets comprises:
      (i) a first set of data for an envelope, wherein said first set of data comprises non-text graphic data, and,
      (ii) a second set of data for a document,
   (b) for each of said plurality of mailers, placing said first set of data for said envelope and said second set of data for said document in a production queue,
   (c) performing in any order or in parallel:
      (1) generating said envelope using said first set of data, wherein said generation of said envelope comprises,
         (i) digitally printing on flat envelope stock using said first set of data,
         (ii) cutting and/or trimming said digitally printed flat envelope stock, and,
         (iii) folding and gluing said digitally printed flat envelope stock into said envelope,
      (2) generating said document using said second set of data,
   (d) for each of said plurality of data sets, using artificial intelligence to automatically verify the correct generation and sequence of said envelope and automatically verify the correct generation and sequence of said document,
   (e) removing any of said plurality of envelopes or said plurality of documents if the verification process returns a false condition for correct generation or sequence in order to maintain order integrity of said production queue,
   (f) automatically regenerating said incorrectly generated or sequenced piece and all other corresponding piece(s) of said mailer,
   (g) matching a verified envelope with a matching verified document, and,
   (h) creating said mailer.

2. The method of claim 1 wherein the matching algorithm is established for each and every mailer unit produced with pattern recognition reloaded for each unit according to instructions for the production queue.

3. The method of claim 1 wherein said mailer is identified by an automatic sorting machine and compared with a list of mailers in the production queue to verify production and entry into the postal stream.

4. The method of claim 3 wherein a record of the verified mailer is created.

5. The method of claim 1 wherein the data is received from an internet interface.

6. The method of claim 1 wherein said mailer is ordered from one geographic area and produced and delivered in a second geographic area.

7. A method of generating a plurality of mailers on demand comprising:
 (a) receiving in a computer a plurality of data sets for a plurality of mailers, wherein each of said plurality of data sets comprises:
  (i) a first set of data for an envelope and,
  (ii) a second set of data for a document,
 (b) for each of said plurality of mailers, placing said first set of data for said envelope and said second set of data for said document in a production queue,
 (c) performing in any order or in parallel:
  (1) generating said envelope using said first set of data, wherein said generation of said envelope comprises,
   (i) digitally printing on flat envelope stock using said first set of data,
   (ii) cutting and/or trimming said digitally printed flat envelope stock, and,
   (iii) folding and gluing said digitally printed flat envelope stock into said envelope,
  (2) generating said document using said second set of data,
 (d) for each of said plurality of data sets, using artificial intelligence to automatically verify the correct generation and sequence of said envelope and automatically verify the correct generation and sequence of said document,
 (e) removing any of said plurality of envelopes or said plurality of documents if the verification process returns a false condition for correct generation or sequence in order to maintain order integrity of said production queue,
 (f) matching a verified envelope with a matching verified document, and,
 (g) creating said mailer.

8. The method of claim 7 wherein the matching algorithm is established for each and every mailer unit produced with pattern recognition reloaded for each unit according to instructions for the production queue.

9. The method of claim 7 wherein said mailer is identified by an automatic sorting machine and compared with a list of mailers in the production queue to verify production and entry into the postal stream.

10. The method of claim 9 wherein a record of the verified mailer is created.

11. The method of claim 7 wherein the data is received from an internet interface.

12. The method of claim 7 wherein said mailer is ordered from one geographic area and produced and delivered in a second geographic area.

* * * * *